(12) United States Patent
Mayers

(10) Patent No.: US 11,010,856 B2
(45) Date of Patent: *May 18, 2021

(54) METHOD AND APPARATUS FOR DETERRENCE AND DETECTION OF LEAKAGE DURING REMOTE INTERACTIVE SESSIONS

(71) Applicant: CITRIX SYSTEMS, INC., Fort Lauderdale, FL (US)

(72) Inventor: Chris Mayers, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,722

(22) Filed: Nov. 15, 2019

(65) Prior Publication Data

US 2020/0082490 A1 Mar. 12, 2020

Related U.S. Application Data

(63) Continuation of application No. 15/825,561, filed on Nov. 29, 2017, now Pat. No. 10,504,201.

(51) Int. Cl.
| | |
|---|---|
| *G06T 1/00* | (2006.01) |
| *G06F 3/14* | (2006.01) |
| *G06F 9/455* | (2018.01) |
| *H04L 29/06* | (2006.01) |
| *G06F 21/62* | (2013.01) |
| *G06F 21/10* | (2013.01) |
| *G06F 21/00* | (2013.01) |
| *G06F 9/451* | (2018.01) |
| *H04L 29/08* | (2006.01) |

(52) U.S. Cl.
CPC .......... *G06T 1/0021* (2013.01); *G06F 3/1454* (2013.01); *G06F 9/45545* (2013.01); *G06F 9/45558* (2013.01); *G06F 21/00* (2013.01); *G06F 21/10* (2013.01); *G06F 21/6209* (2013.01); *H04L 63/00* (2013.01); *G06F 9/452* (2018.02); *G06F 2009/45579* (2013.01); *G06F 2009/45595* (2013.01); *G06F 2221/0733* (2013.01); *G09G 2358/00* (2013.01); *H04L 67/08* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,175,639 | B1* | 1/2001 | Satoh | G06T 1/0071 |
| | | | | 382/100 |
| 6,449,378 | B1* | 9/2002 | Yoshida | G06T 1/0085 |
| | | | | 382/100 |
| 2006/0107056 | A1* | 5/2006 | Bhatt | G06T 1/0021 |
| | | | | 713/176 |

* cited by examiner

*Primary Examiner* — Fayyaz Alam
(74) *Attorney, Agent, or Firm* — Allen, Dyer, Doppelt + Gilchrist, PA

(57) ABSTRACT

A server includes a virtual machine to execute a remote graphics generation protocol. Execution of the remote graphics generation protocol determines a protection label to be inserted within a bitmap that is to be transmitted for display on a client machine associated with the virtual machine, and determines at least one optimization technique to be performed on the bitmap. A determination is made on if the at least one optimization technique, if performed, alters the at least one protection label when inserted within the bitmap. The protection label is inserted within the bitmap.

20 Claims, 4 Drawing Sheets

METHOD AND APPARATUS FOR DETERRENCE AND DETECTION OF LEAKAGE DURING REMOTE INTERACTIVE SESSIONS

RELATED APPLICATIONS

This application is a continuation of U.S. application Ser. No. 15/825,561 filed Nov. 29, 2017, which is hereby incorporated herein in its entirety by reference.

TECHNICAL FIELD

The present disclosure relates to computer virtualization, and more particularly, to deterring and detecting recording of a display at a client device during a remote interactive session.

BACKGROUND

A remote-access computing environment may include a virtualization server configured to provide virtual machines for client devices. During remote interactive sessions, the client devices may display application output generated by an application remotely executing on the virtualization server.

The application output displayed at the client devices may have sensitive or proprietary content. An unscrupulous user of one of the client devices receiving the sensitive or proprietary content may take a photograph or a screen shot of the display so as to record the sensitive or proprietary content. Taking a photograph or a screen shot of the display during a remote interactive session may be referred to as an out-of-band analog attack.

The user who took the photograph with sensitive or proprietary content may then digitize the photograph and send over the Internet. Consequently, there is a need to deter and detect such leakage of sensitive or proprietary content in the context of remote interactive sessions.

SUMMARY

A server includes at least one virtual machine configured to execute a remote graphics generation protocol. Execution of the remote graphics generation protocol determines at least one protection label to be inserted within a bitmap that is to be transmitted for display on a client machine associated with the at least one virtual machine, and determines at least one optimization technique to be performed on the bitmap. A determination is made on if the at least one optimization technique, if performed, alters the at least one protection label when inserted within the bitmap. The at least one protection label is inserted within the bitmap.

The at least one protection label may be inserted within the bitmap without performing the at least one optimization technique if performing the at least one optimization technique alters the at least one protection label.

The at least one virtual machine may be further configured to perform the at least one optimization technique on the bitmap before inserting the at least one protection label if performing the at least one optimization technique does not alter the at least one protection label.

The at least one virtual machine may be further configured to generate the bitmap.

Inserting the at least one protection label may comprise inserting a covert protection label that is not visible when the bitmap is displayed on the client machine.

Inserting the covert protection label may comprise embedding the covert protection label within the bitmap. The covert protection label may comprise at least one of a bit color change in the bitmap, changing position of where the bitmap is to be displayed on the client machine, and adding a unique mark to the bitmap.

Inserting the at least one protection label may comprise inserting a visual protection label that is visible when the bitmap is displayed on the client machine.

If the determined optimization technique comprises a lossy compression of the bitmap, then the at least one protection label may be inserted within the bitmap without performing the lossy compression of the bitmap.

If the determined optimization technique comprises changing color bits in the bitmap, then the at least one protection label may be inserted within the bitmap after the color bit change has been performed.

The bitmap may comprise segmented portions, with the at least one protection label to be divided among the segmented portions, and with each segmented portion having an optimization technique associated therewith so that determining if the at least one optimization technique, if performed, alters the at least one protection label, comprises determining if the optimization technique for each segmented portion, if performed, alters the divided protection label.

Another aspect is directed to a method for executing a remote graphics generation protocol for at least one virtual machine in a virtualization server. The method comprises determining at least one protection label to be inserted within a bitmap that is to be transmitted for display on a client machine associated with the at least one virtual machine, and determining at least one optimization technique to be performed on the bitmap. The method further comprises determining if the at least one optimization technique, if performed, alters the at least one protection label when inserted within the bitmap, and inserting the at least one protection label within the bitmap.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As a general introduction, a virtual machine is configured to execute a remote graphics generation protocol that generates bitmaps for display on a client device associated with the virtual machine. Before each bitmap is transmitted to the client device, the remote presentation protocol is configured to insert protection labels in the bitmap, and optimize the bitmap before transmitting to the client device. However, the protection labels may be adversely affected by the optimization. As will be explained in greater detail below, the remote graphics generation protocol advantageously looks at how the optimization will affect the protection labels before performing the optimization, and makes adjustments accordingly so that the protections labels remain within the bitmap.

Figure 1:
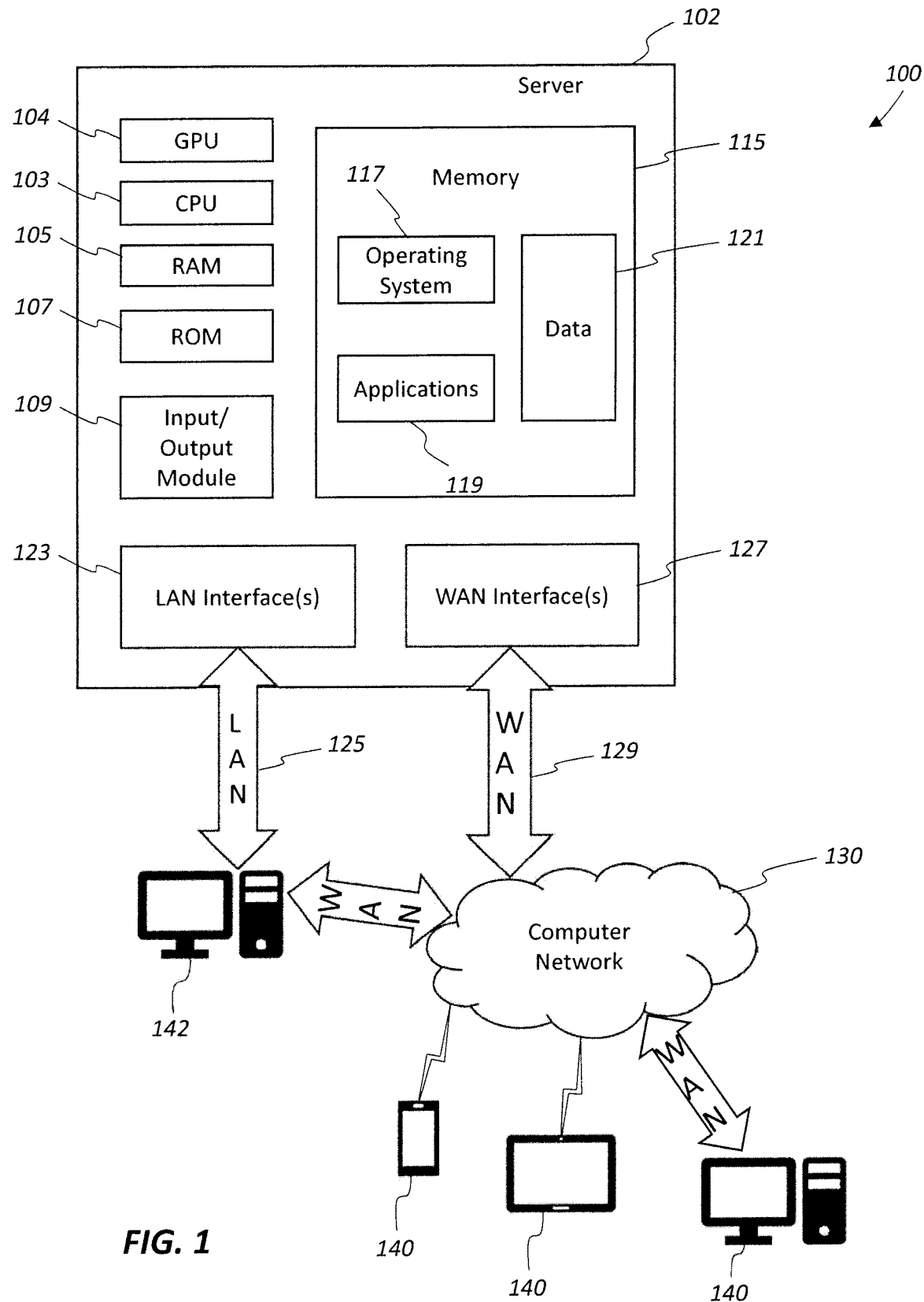
FIG. 1 is a block diagram illustrating a remote-access computing environment that may be used in accordance with one or more illustrative aspects described herein.

Referring initially to FIG. 1, a remote-access computing environment 100 includes a generic computing device that may be used as a server 102 in a single-server or multi-server desktop virtualization system (e.g., a remote access or cloud system) configured to provide virtual machines for client devices 140.

The server 102 may have a central processing unit (CPU) 103 for controlling overall operation of the server 102 and its associated components, including RAM 105, ROM 107, I/O module 109, and memory 115. The generic computing device 102 may also have a graphics processing unit (GPU) 104 for efficiently manipulating computer graphics and image processing. The I/O module 109 may include a mouse, keypad, touch screen, scanner, optical reader, and/or stylus (or other input device) through which a user or administrator of the server 102 may provide input, and may also include one or more of a speaker for providing audio output and a video display device for providing textual, audiovisual, and/or graphical output.

Software may be stored within the memory 115 and/or other storage to provide instructions to the CPU 103 and GPU 104 for configuring the server 102 into a special purpose computing device in order to perform various functions as described herein. For example, the memory 115 may store software used by the server 102, such as an operating system 117, application programs 119, and an associated database 121.

The server 102 may operate in a networked environment supporting connections to one or more remote computers, such as terminals 140 (also referred to as client devices or client machines). The client devices 140 may be personal computers, mobile devices, laptop computers, tablets, or servers that include many or all of the elements described above with respect to the server 102.

The network connections depicted in FIG. 1 include a local area network (LAN) 125 and a wide area network (WAN) 129, but may also include other networks. When used in a LAN networking environment, the server 102 may be connected to the LAN 125 through a network interface or adapter 123. When used in a WAN networking environment, the server 102 may include a modem 127 or other wide area network interface for establishing communications over the WAN 129, such as computer network 130 (e.g., the Internet).

It will be appreciated that the network connections shown are illustrative and other means of establishing a communications link between the server 102 and the client devices 140 may be used. The server 102 and the client devices 140 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

One or more client devices 140 may be in communications with the server 102 via the computer network 130. In one embodiment, the computing environment 100 may include a network appliance 142 installed between the server 102 and the client devices 140. The network appliance may manage client/server connections, and in some cases can load balance client connections amongst a plurality of backend servers 102.

The client devices 140 may in some embodiments be referred to as a single client device 140 or a single group of client devices 140, while the server 102 may be referred to as a single server 102 or a single group of servers 102 when there are multiple servers. In one embodiment a single client device 140 communicates with more than one server 102, while in another embodiment a single server 102 communicates with more than one client device 140. In yet another embodiment, a single client device 140 communicates with a single server 102.

A client device 140 can, in some embodiments, be referenced by any one of the following non-exhaustive terms: client machine; client; client computer; client computing device; local machine; remote machine; client node; endpoint; or endpoint node. The server 102, in some embodiments, may be referenced by any one of the following non-exhaustive terms: local machine; remote machine; server farm, or host computing device.

In one embodiment, the client device 140 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on the server 102 or a hypervisor executing on a client device 140.

Some embodiments include a client device 140 that displays application output generated by an application remotely executing on a server 102 or other remotely located machine. In these embodiments, the client device 140 may execute a virtual machine receiver program or application to display the output in an application window, a browser, or other output window.

In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 102, in some embodiments, uses a remote graphics generation protocol or other program to send data to a thin-client or remote-display application executing on the client device 140 to present display output generated by an application executing on the server 102. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

As discussed above, the remote-access computing environment 100 allows for a desktop virtualization system that includes at least one virtualization server 102 configured to provide virtual desktops and/or virtual applications to one or more client access devices 140.

As used herein, a desktop refers to a graphical environment or space in which one or more applications may be hosted and/or executed. A desktop may include a graphical shell providing a user interface for an instance of an operating system in which local and/or remote applications can be integrated.

Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
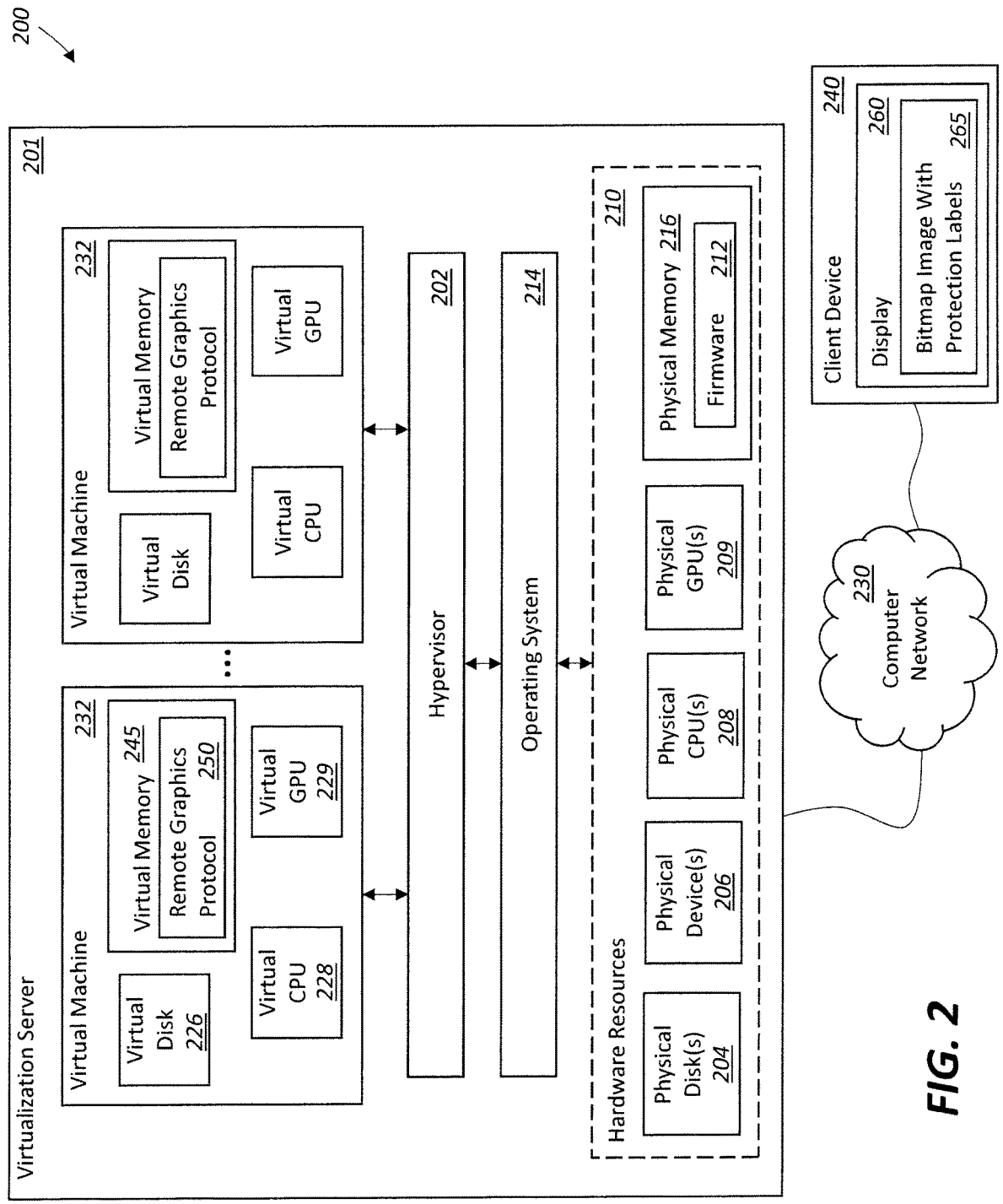
FIG. 2 is a block diagram illustrating a virtualized computing environment that may be used in accordance with one or more illustrative aspects described herein.

Referring now to FIG. 2, the above-described server 102 may be configured as a virtualization server 201 in a virtualization environment 200. The virtualization server 201 may still be referred to as a server. The virtualization server 201 may be in communications via a computer network 230 with one or more client access devices 240, each operating as a virtual machine.

Included in the virtualization server 201 is a hardware layer that includes hardware resources 210. The hardware resources 210 include one or more physical disks 204, one or more physical devices 206, one or more physical central processing units (CPUs) 208, one or more physical graphic processing units (GPUs) 209, and one or more physical memories 216. In some embodiments, firmware 212 can be stored within a memory element in the physical memory 216 and can be executed by one or more of the physical CPUs 208 and GPUs 209. Programs or executable instructions stored in the physical memory 216 can be executed by the one or more physical CPUs 208 and GPUs 209.

The virtualization server 201 may further include an operating system 214 that may be stored in a memory element in the physical memory 216 and executed by one or more of the physical CPUs 208. Still further, a hypervisor 202 may be stored in a memory element in the physical memory 216 and can be executed by one or more of the physical CPUs 208.

The physical devices 206 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201.

The physical memory 216 may include any type of memory. The physical memory 216 may also store data, and in some embodiments may store one or more programs, or set of executable instructions.

The hypervisor 202 may be a program executed by the physical CPUs 208 to create and manage any number of virtual machines 232. The hypervisor 202 may be referred to as a virtual machine monitor, or platform virtualization software. A portion of the hardware resources 210 within the hardware layer may be allocated as virtualized resources, which may then be allocated to the virtual machines.

Still referring to FIG. 2, each virtual machine 232 may operate as an independent guest computing device, and may include a virtual disk 226, a virtual CPU 228, a virtual GPU 229 and a virtual memory 245 allocated by the hypervisor 202 to the virtual machine 232. The virtual memory 245 may include instructions for a remote graphics generation protocol 250 to be executed by the virtual CPU 228 and virtual GPU 229.

Execution of the remote graphics generation protocol 250 by the virtual machine 232 allows for insertion of protection labels within a generated bitmap, and optimization of the generated bitmap prior to being transmitted. The generated bitmap 265 with protection labels after optimization is transmitted to the client device 240 associated with the virtual machine 232 as part of a remote interactive session. The bitmap image 265 with protection labels is then displayed on a display 260 of the client device 240.

When the bitmap includes sensitive or proprietary content, an administrator of the virtualization server 201 may configure the remote graphics generation protocol 250 to insert protection labels within a generated bitmap. The protection labels may be a combination of visual protection labels and covert protection labels. When both visual and covert protection labels are used, care is to be taken in selecting the respective types of labels being used so that they do not interfere with one another. Alternatively, as enabled by the administrator, visual protection labels may be used without covert protection labels, and covert protection labels may be used without visual protection labels.

As discussed in the background, an unscrupulous user of one of the client devices 240 receiving the sensitive or proprietary content may take a photograph or a screen shot of the display so as to record the sensitive or proprietary content. The user who took the photograph may then digitize the photograph and send over a network. When sent over the network, the visual and covert protection labels help to detect such a recording of sensitive or proprietary content.

A visual protection label is a semi-transparent visual overlay that is displayed at the client device 240 within the remote interactive session, and appears as though it is on top of the content being displayed. The visual protection label acts a deterrent to the user.

The visual protection label is individualized to the user. The visual protection label may include, for example, the name of the organization the user is associated with, the name of the user, the time and date that the remote interactive session was started, the category of sensitive or proprietary information that is available within the remote interactive session, and a reference to the organization's acceptable use policy.

When the remote interactive session is started, the visual protection label is generated and inserted within the generated bitmap that is to be transmitted to and displayed on the client device 240. The remote graphics generation protocol 250 ensures that the visual protection label is not hidden by applications executed by the virtual machine 232.

The covert protection label is not visible when the bitmap is displayed on the client machine 240. The remote graphics generation protocol 250 encodes a marking within the display output. The covert protection label is later used by covert protection label detection software to detect misuse of the sensitive or proprietary information that was available within the remote interactive session.

When the remote interactive session is started, the covert protection label is generated and is ready to be inserted within the generated bitmap that is to be transmitted to and displayed on the client device 240 within the remote interactive session. The covert protection label may be embedded within the bitmap. Example covert protection labels include a bit color change in the bitmap, changing position of where the bitmap is to be displayed on the client device 240, and adding a unique mark to the bitmap. The unique mark may enable traitor tracing. The covert protection label may also be applied wherever data becomes available, such as when scanning data at rest, for example.

As noted above, a visual protection label deters a user that may mishandle the sensitive or propriety content, and a covert protection label is used to detect mishandling of the sensitive or propriety content. Both of these protection labels may be referred to as digital watermarks. The respective visual and covert protection labels thus have different functions, and can be used independently.

The visual and covert protection labels are embedded in the content in a manner that cannot easily be removed or modified, including within copies or recordings of the content. Visual labeling is generally intended to be clearly visible but unobtrusive. Covert labeling is intended to be difficult to identify except by authorized facilities.

Visual labeling can be used for various purposes. Visual labeling of proprietary content is commonly used with previews of licensed images, such as commercial photography. A prominent visual label usually identifies the content owner (such as the copyright holder), and also means the image cannot be used publicly. Often such preview images are low-resolution.

Visual labeling of sensitive content is commonly used as a background marking for documents, possibly indicating a document classification or handling policy. This is often supported by applications for editing such documents. The background marking is sometimes individuated to the user or organization that has been given the document.

Visual indication of sensitive content may be applied to a remote interactive session, as discussed above. For example, this may be achieved by having a distinct desktop background wallpaper for sessions in which applications that handle sensitive content are displayed. This may include administrative sessions as well.

In systems that support simultaneous handling of different sensitivities (multi-level or multi-lateral systems), the windows in which the applications are displayed will have an explicit sensitivity label. The system will also control transfer of information between such windows. In this context, the visual indication is a reminder to the user to enter information only into the appropriate window. The disadvantage of these mechanisms are they do not allow detection of recordings, and simple mechanisms such as desktop background wallpaper are obscured when applications are displayed.

Covert labeling is an information hiding technique. A survey is given in chapter 22 (titled Copyright and DRM) of a Security Engineering book authored by Ross Anderson. This book also describes possible embedding schemes, and attacks on these embedding schemes. Described embedding schemes may include: keyed embedding, pixel parity encoding, repetition codes, spread spectrum encoding, perceptual filtering, and media-dependent modification.

Implementation of the covert protection label is not limited to any particular embedding scheme. However, the embedding scheme should be selected so that it can be directly integrated with the remote graphics generation protocol 250, and covert protection labels are preserved via analog recording. For example, coping with poor lighting conditions, recording at an angle to the display, and so on. The embedding scheme is to be sufficiently robust against deliberate removal, can readily be replaced, and supports multiple mechanisms.

In addition, the covert protection label is to be supported by third-party product and service suppliers. For example, data-loss-prevention products already have mechanisms to detect intentional data exfiltration, and to deal with multiple data formats. Using an embedding scheme that is already supported will simplify third-party integration.

As readily appreciated by those skilled in the art, remote graphics generation protocols 250 are highly optimized. Optimization by the remote graphics generation protocol 250 advantageously reduces bandwidth of the bitmap being transmitted to the client device 240, as well as conserving resources (e.g., virtual CPU 228, and virtual CPU 229) within the virtual machine 232.

A remote graphics generation protocol 250 may detect display regions that have not changed, large expanses of color, discriminate text from graphics, and so on. A remote graphics generation protocol 250 may also apply lossy compression selectively, and is aware of graphics configuration (such as multi-monitor), and application window placement.

However, a problem with optimization is that the protection labels may be adversely affected within the bitmap. As noted above, example covert protection labels include a bit color change in the bitmap, changing position of where the bitmap is to be displayed on the client device 240, and adding a unique mark to the bitmap.

Insertion of a covert protection label thus involves changing the bits within the bitmap that is to be optimized. If the optimization technique uses a lossy compression of the bitmap, for example, this involves stripping out some of the bits in the bitmap to be transmitted to the client device 240. The bits that are stripped out from the lossy compression may be associated with the cover protection label. Consequently, the covert protection label may be altered or removed.

As another example, the optimization technique may change color bits in the bitmap so as to more efficiently handle display regions that have not changed or to more efficiently handle large expanses of color. If the covert protection label (in the form of a bit color change) is inserted within anyone of these areas, the optimization technique may strip out the bit color change and replace with a common set of bit colors representative of these area.

To address the problem of adversely affecting a protection label embedded within a bitmap during optimization of the bitmap, the remote graphics generation protocol 250 advantageously looks at how the optimization will affect the protection labels before performing the optimization, and makes adjustments accordingly so that the protections labels remain within the bitmap.

Figure 3:
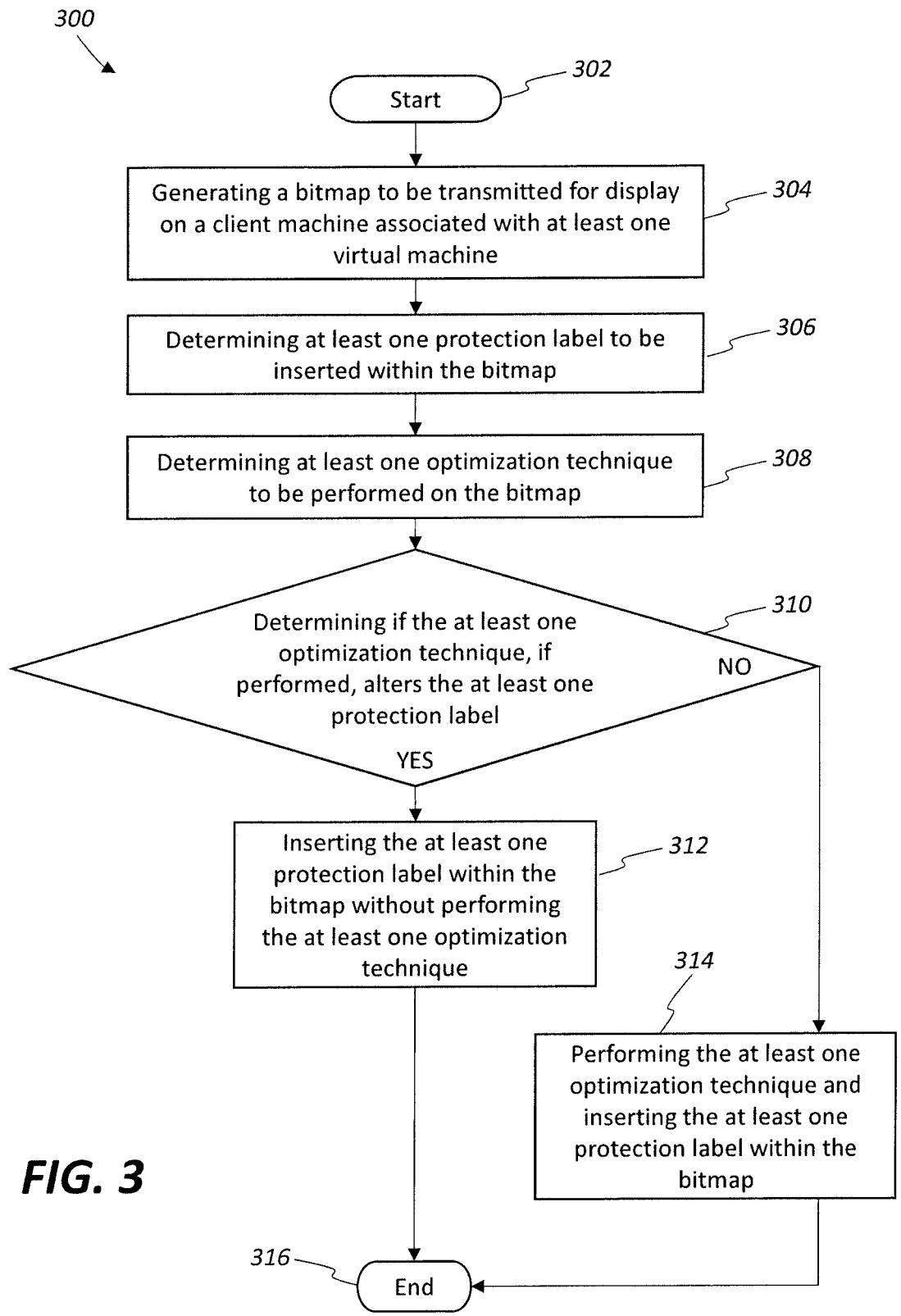
FIG. 3 is a flowchart illustrating a method for executing a remote graphics generation protocol for the virtualized computing environment illustrated in FIG. 2.

Referring now to the flowchart 300 in FIG. 3, a method for executing the remote graphics generation protocol 250 for the virtual machine 232 in a virtualization server 201 will be discussed. From the start (Block 302), the method comprises generating a bitmap to be transmitted for display on a client machine 240 associated with the virtual machine 232 at Block 304, determining at least one protection label to be inserted within the bitmap at Block 306, and determining at least one optimization technique to be performed on the bitmap at Block 306.

At decision Block 310, the method comprises determining if the at least one optimization technique, if performed, alters the at least one protection label. If yes, then the at least one protection label is inserted within the bitmap at Block 312 without performing the at least one optimization technique. If no, then the at least one optimization technique is performed and the at least one protection label is inserted within the bitmap at Block 314. The method ends at Block 316.

As an example, if the determined optimization technique comprises a lossy compression of the bitmap, then the at least one protection label is inserted within the bitmap without performing the lossy compression of the bitmap. Here, the remote graphics generation protocol 250 sacrifices bandwidth by not performing the optimization technique so as to keep the protection labels inserted within the transmitted bitmap.

As another example, if the determined optimization technique comprises changing color bits in the bitmap, then the at least one protection label is inserted within the bitmap after the color bit change has been performed. Here, the remote graphics generation protocol 250 delays insertion of the protection label until after the optimization technique has been performed.

If the covert protection label is based on moving the display over by 1 bit, for example, and the optimization technique is not lossy compression, then the remote graphics generation protocol 250 may again delay insertion of the covert protection label until after the optimization technique has been performed.

As also readily appreciated by those skilled in the art, the bitmap to be transmitted to the client device 240 may be segmented, where each segmented portion can be individually optimized. In this case, a covert protection label may be spread out or divided among the segmented portions. As discussed above, each segmented portion will be evaluated for any part of a covert protection label and as well as the optimization technique to be performed for that segmented portion.

Figure 4:
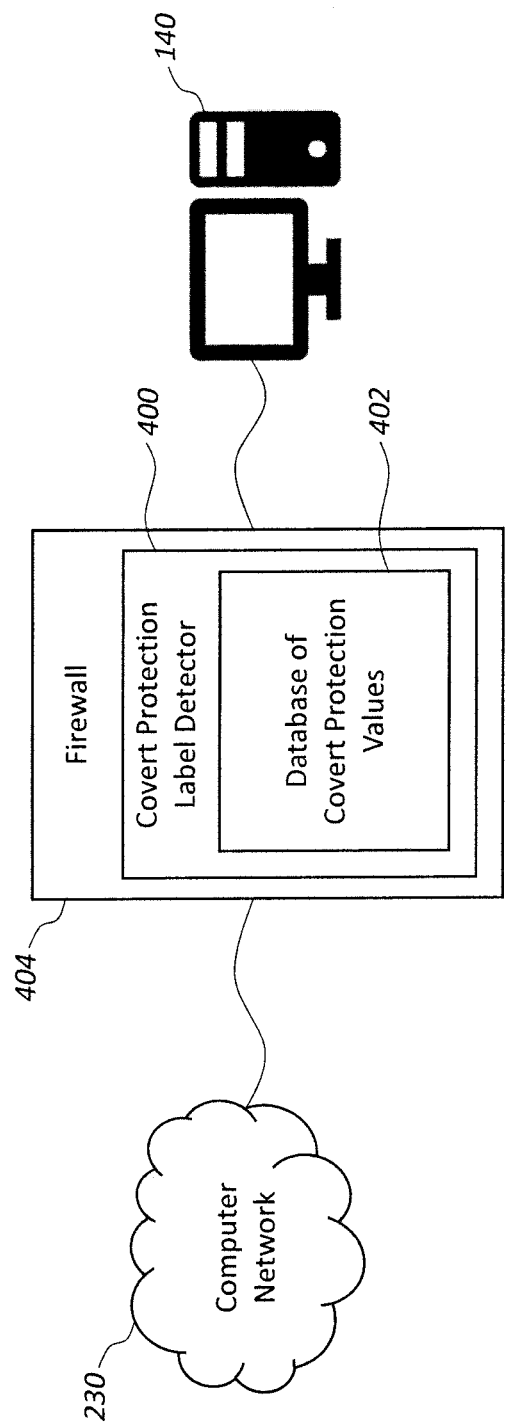
FIG. 4 is a block diagram of a covert protection label detector used to detect covert protection labels generated by the virtualized computing environment illustrated in FIG. 2.

As illustrated in FIG. 4, a covert protection label detector 400 may be used to detect covert protection labels. The covert protection label detector 400 may be implemented as standalone software.

Assume an unscrupulous user of the client device 240 took a picture of the display 260, and that a bitmap image with protection labels 265 was displayed when photographed. The unscrupulous user may then later digitize the photograph for transmission over the computer network 230. Prior to transmission, the digitized photograph may be scrubbed by the unscrupulous user so as to remove the visual protection labels and any detected covert protection labels.

When data is transferred, for example, via a file transfer service, the service may use the covert protection label detector 400 to inspect the content for a covert protection label. This would typically be done when the data crosses an outbound perimeter, for example, at a firewall, gateway, or proxy server.

The illustrated covert protection label detector 400 is included within a firewall 404. The firewall 404 monitors and controls incoming and outgoing network traffic based on predetermined security rules.

When a covert protection label is detected, the covert protection label detector 400 determines a value of the covert protection label. This value may then be compared to a database or index 402 of covert protection label values. The database 402 may be located with the covert protection label detector 400. In other embodiments, the database 402 may be remotely access by the covert protection label detector 400.

The covert protection label value will include information on the unscrupulous user who took the photograph as well as information on the particular remote interactive session that generated the covert protection label. After comparing to the database 402, the covert protection label detector 400 determines if the transferred data should be flagged if the covert protection label value matches up to an illegal recording. The determination may then be provided to a computing device 140 coupled to the firewall 404.

Yet another aspect is directed to a non-transitory computer readable medium for at least one virtual machine 232 in a virtualization server 201, with the non-transitory computer readable medium having a plurality of computer executable instructions for causing the at least one virtual machine 232 to execute a remote graphics generation protocol 250 to perform steps as described above. The steps include generating a bitmap to be transmitted for display on a client machine 240 associated with the at least one virtual machine 232, determining at least one protection label to be inserted within the bitmap, and determining at least one optimization technique to be performed on the bitmap. The next step is to determine if the at least one optimization technique, if performed, alters the at least one protection label. If yes, then the at least one protection label is inserted within the bitmap without performing the at least one optimization technique. If no, then the at least one optimization technique is performed and the at least one protection label is inserted within the bitmap.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A server comprising:
    at least one virtual machine configured to execute a remote graphics generation protocol to perform the following:
        determine at least one protection label to be inserted within a bitmap that is to be transmitted for display on a client machine associated with the at least one virtual machine,
        determine at least one optimization technique to be performed on the bitmap,
        in response to the at least one optimization technique being performed, alter the at least one protection label when inserted within the bitmap, and
        insert the at least one protection label within the bitmap.

2. The server according to claim 1 wherein the at least one protection label is inserted within the bitmap without performing the at least one optimization technique if performing the at least one optimization technique alters the at least one protection label.

3. The server according to claim 1 wherein the at least one virtual machine is further configured to perform the at least one optimization technique on the bitmap before inserting the at least one protection label if performing the at least one optimization technique does not alter the at least one protection label.

4. The server according to claim 1 wherein the at least one virtual machine is further configured to generate the bitmap.

5. The server according to claim 1 wherein inserting the at least one protection label comprises inserting a covert protection label that is not visible when the bitmap is displayed on the client machine.

6. The server according to claim 5 wherein inserting the covert protection label comprises embedding the covert protection label within the bitmap.

7. The server according to claim 5 wherein the covert protection label comprises at least one of a bit color change in the bitmap, changing position of where the bitmap is to be displayed on the client machine, and adding a unique mark to the bitmap.

8. The server according to claim 1 wherein inserting the at least one protection label comprises inserting a visual protection label that is visible when the bitmap is displayed on the client machine.

9. The server according to claim 1 wherein if the determined optimization technique comprises a lossy compression of the bitmap, then the at least one protection label is inserted within the bitmap without performing the lossy compression of the bitmap.

10. The server according to claim 1 wherein if the determined optimization technique comprises changing color bits in the bitmap, then the at least one protection label is inserted within the bitmap after the color bit change has been performed.

11. The server according to claim 1 wherein the bitmap comprises segmented portions, with the at least one protection label to be divided among the segmented portions, and with each segmented portion having an optimization technique associated therewith so that determining if the at least one optimization technique, if performed, alters the at least one protection label, comprises determining if the optimization technique for each segmented portion, if performed, alters the divided protection label.

12. A method for executing a remote graphics generation protocol for at least one virtual machine in a virtualization server comprising:
   determining at least one protection label to be inserted within a bitmap that is to be transmitted for display on a client machine associated with the at least one virtual machine;
   determining at least one optimization technique to be performed on the bitmap;
   in response to the at least one optimization technique being performed, altering the at least one protection label when inserted within the bitmap, and
   inserting the at least one protection label within the bitmap.

13. The method according to claim 12 wherein the at least one protection label is inserted within the bitmap without performing the at least one optimization technique if performing the at least one optimization technique alters the at least one protection label.

14. The method according to claim 12 wherein the at least one virtual machine is further configured to perform the at least one optimization technique on the bitmap before inserting the at least one protection label if performing the at least one optimization technique does not alter the at least one protection label.

15. The method according to claim 12 wherein inserting the at least one protection label comprises inserting a covert protection label that is not visible when the bitmap is displayed on the client machine.

16. The method according to claim 12 wherein inserting the at least one protection label comprises inserting a visual protection label that is visible when the bitmap is displayed on the client machine.

17. The method according to claim 12 wherein if the determined optimization technique comprises a lossy compression of the bitmap, then the at least one protection label is inserted within the bitmap without performing the lossy compression of the bitmap.

18. The method according to claim 12 wherein if the determined optimization technique comprises changing color bits in the bitmap, then the at least one protection label is inserted within the bitmap after the color bit change has been performed.

19. The method according to claim 12 wherein the bitmap comprises segmented portions, with the at least one protection label to be divided among the segmented portions, and with each segmented portion having an optimization technique associated therewith so that determining if the at least one optimization technique, if performed, alters the at least one protection label, comprises determining if the optimization technique for each segmented portion, if performed, alters the divided protection label.

20. A server comprising:
   at least one virtual machine configured to execute a remote graphics generation protocol to perform the following:
      generate a bitmap to be transmitted for display on a client machine associated with the at least one virtual machine,
      determine at least one protection label to be inserted within the bitmap,
      determine at least one optimization technique to be performed on the bitmap,
      in response to the at least one optimization technique being performed, alter the at least one protection label when inserted within the bitmap,
      insert the at least one protection label within the bitmap without performing the at least one optimization technique if performing the at least one optimization technique alters the at least one protection label, and
      perform the at least one optimization technique on the bitmap before inserting the at least one protection label if performing the at least one optimization technique does not alter the at least one protection label.

* * * * *